July 29, 1924.

B. BART

ASTROLOGICAL CHART

Filed Dec. 22, 1922

1,502,761

Inventor
Belle Bart

By her Attorney

Patented July 29, 1924.

1,502,761

UNITED STATES PATENT OFFICE.

BELLE BART, OF NEW YORK, N. Y.

ASTROLOGICAL CHART.

Application filed December 22, 1922. Serial No. 608,400.

*To all whom it may concern:*

Be it known that I, BELLE BART, a citizen of the United States, and residing at the city, county, and State of New York, have invented certain new and useful Improvements in Astrological Charts, of which the following is a specification.

This invention relates to an astrological chart or device for use in casting horoscopes or nativities.

According to astrology the aspects of the stars or planets, that is their positions in the heavens and their angular relationships, exert an influence on human affairs and enable one skilled in the art to foretell events of a person's life.

The principal object of the invention is to provide a simple and easily manipulated device for determining the aspects of the planets on a given date with respect to the day of a person's birth.

Another object is to provide an entertaining and instructive device whereby persons unskilled in astrology can cast horoscopes for themselves or others.

Generally speaking the invention comprises a chart representing the zodiac, and a plurality of markers representing various planets which markers are adapted to be placed in the several signs and constellations in the positions they would assume on the date for which a horoscope is desired. The chart is provided with characters denoting the months and days of the months, and it has a centrally arranged revoluble member having rays or indicators forming angles corresponding to those of the astrological aspects.

The invention is susceptible of various embodiments one of which is illustrated and described, it being understood that modifications may be made therein without departing from the scope of the claims.

In the accompanying drawings illustrating the invention,

Figure 1:
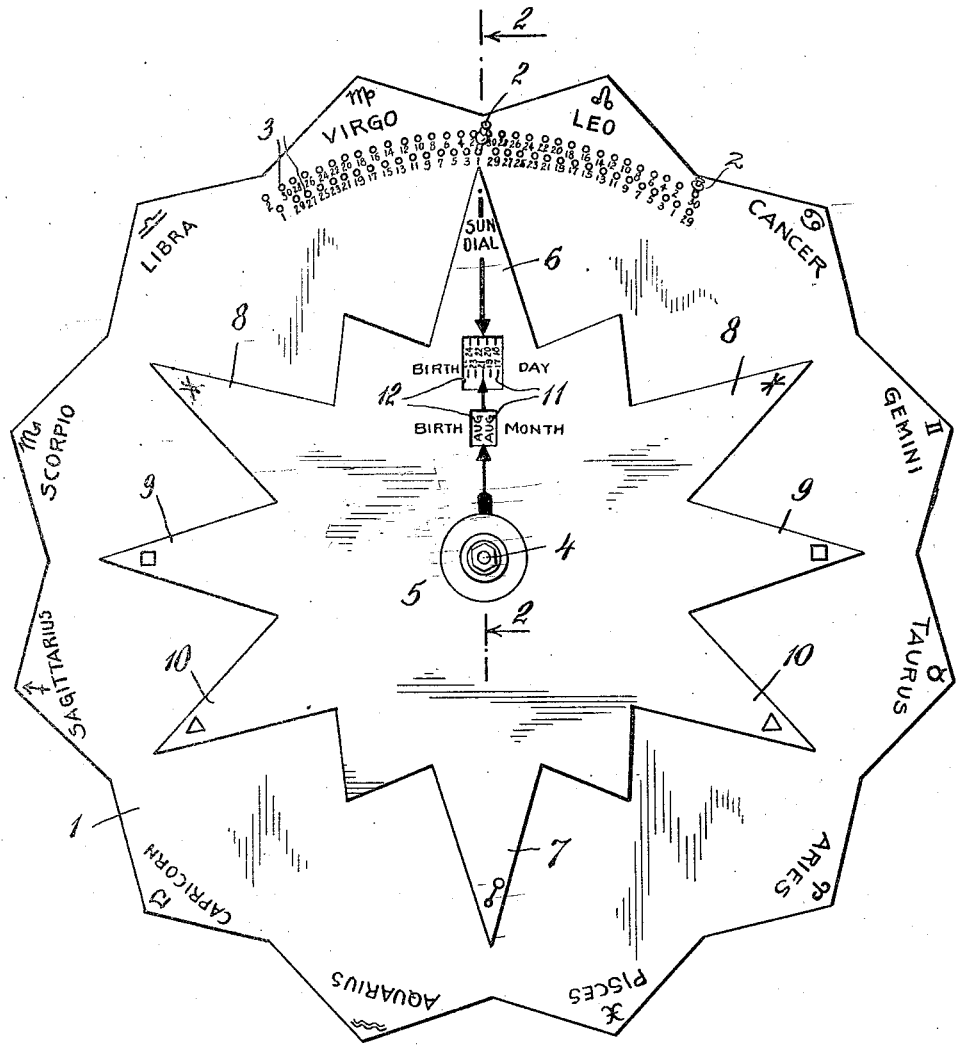
Figure 1 is a plan view of a preferred form of the device.
Figure 2:
Fig. 2 is a sectional view on the line 2—2 of Figure 1.

Referring now to the drawings, 1 indicates a chart laid out in twelve sectors representing the signs, symbols, and constellations of the zodiac. Each sector is divided into thirty degrees which are numbered consecutively from right to left as indicated in the signs or constellations "Leo" and "Virgo," the graduations of the remaining signs being omitted from the drawings for the sake of simplicity. To provide a compact arrangement the graduations are preferably disposed in staggered order as shown.

Markers 2 of any suitable character are provided to represent the stars or planets ordinarily relied upon by astrologers in casting horoscopes. Each marker is appropriately marked to denote the particular planet that it represents, for example, one is marked to denote Mars, another Jupiter, etc. Instructions are furnished with the chart giving the positions of the zodiacal planets for each month for a period of years. In casting a horoscope the markers are placed in their proper positions in the several constellations for the date for which a reading is desired. To facilitate placement of the markers the chart is preferably provided with perforations 3 adjacent the graduations, and the markers 2 are preferably made in the form of pegs adapted to be received in said perforations.

Mounted to turn on a pivot 4 at the center of the chart is a plate 5 formed with eight rays or indicators. Of these the ray 6 constitutes the base from which the angles of the others are measured. This ray represents the position of the sun and is preferably marked with the words "Sun dial" or other suitable indicia. The ray 7 is diametrically opposed to ray 6 and is preferably marked with the astrological symbol for opposition. The remaining rays 8, 9, and 10 at either side of ray 6 form angles of 60, 90 and 120 degrees therewith and are preferably marked with the astrological symbols, sextile, quartile or quadrate, and trine respectively.

In the central portion of the chart, underneath the turn-plate 5, are markings 11 indicating the months and days of the months. Windows or openings 12 are formed in said plate adjacent the ray 6 through which the markings 11 are exposed to view. These markings, which in the drawings are concealed by the plate except for the portion visible through the openings, are arranged in concentric circles and disposed in such order that the day of the month on which the sun enters any sign will be in radial alignment with the first degree of that sign. For example, the sun enters the zodiacal sign or constellation Virgo about the 21st day of August. On referring to the drawings it will be seen that the character representing August 21st is substantially in radial line with the graduation representing the first degree or beginning of the sign Virgo. For convenience in reading and arrangement I have separated the characters designating the months from those designating the days of the months but it is to be understood, of course, that these characters may be combined if desired.

In using the device the plate 5 is turned so that the point of the ray 6 is in line with the day of birth of the person whose horoscope is desired, and the markers 2 are placed in the several signs of the zodiac in the situations that the planets they represent would take on any given date. This will provide an astrography of the heavens for that date, showing the position of the sun on the day of birth and the aspects of the planets in relation thereto, and from which readings may be taken by noting the position of the several rays with reference to the several planets toward which they may point. Explanations are furnished with the chart giving the astrological significance of the aspects of the planets whereby the meanings of the readings may be ascertained.

What I claim is:

1. Apparatus for casting horoscopes comprising a chart representing the zodiac bearing characters denoting the several signs thereof, said chart bearing additional characters denoting the days of the months which latter characters are so arranged that the one designating the approximate day in which the sun enters any sign is substantially in radial alignment with the beginning of that sign, a plurality of markers each representing a planet and adapted to be placed in the signs of the zodiac, and a revoluble member provided with a series of indicators constituting a system of angles of which one indicator forms the base and the others are spaced substantially 60, 90, 120, and 180 degrees therefrom.

2. Apparatus for casting horoscopes comprising a chart representing the zodiac and bearing characters denoting the signs thereof, each sign having a series of perforations dividing it into degrees, said chart also bearing characters denoting the days of the months which latter characters are so arranged that the one designating the approximate day in which the sun enters any sign is substantially in radial alignment with the first degree of that sign, a plurality of markers each representing a planet and adapted to be inserted in the perforations of the signs of the zodiac, and a radiated member pivoted on the center of the chart the rays of which member form angles corresponding to the astrological aspects.

3. An apparatus for casting horoscopes comprising a chart representing the zodiac and bearing characters denoting the several signs thereof, said chart bearing additional characters denoting the days of the months which latter characters are so arranged that the one designating the approximate date upon which the sun enters any sign is substantially in radial alignment with the beginning of that sign, a plurality of markers each representing a planet and adapted to be placed in the signs of the zodiac, and a turn-plate disposed centrally of the zodiacal signs and provided with a series of indicators constituting a system of angles, corresponding to the astrological aspects, of which one of said indicators forms the base, said plate having an opening in line with the basal indicator through which a portion of the date characters are exposed.

4. In apparatus of the character described, a chart bearing characters denoting the several zodiacal signs and additional characters denoting the days of the months, the latter characters being so arranged that the one designating the approximate day in which the sun enters any sign is substantially in radial alignment with the beginning of that sign, and a revoluble member provided with a series of indicators fixed at angles corresponding to the astrological aspects.

BELLE BART.